3,480,558
CATALYST REGENERATION
David W. Lum and Irving L. Mador, Cincinnati, Ohio, assignors to National Distillers and Chemical Corporation, New York, N.Y., a corporation of Virginia
No Drawing. Filed June 10, 1966, Ser. No. 557,599
Int. Cl. B01j *11/18;* C07c *67/04*
U.S. Cl. 252—416                                                                  6 Claims

ABSTRACT OF THE DISCLOSURE

A method for the regeneration of a spent Group VIII noble metal catalyst such as palladium for reuse in the preparation of unsaturated organic esters. The spent catalyst is sequentially treated with oxygen and hydrogen to effect regeneration. An inert gas stream is passed over the catalyst initially, intermediate to the oxygen and hydrogen treatments, and subsequent to the hydrogen treatment.

---

This invention relates generally to a novel process for catalyst regeneration. More particularly, the invention pertains to a process for regeneration of catalysts used in the manufacture of unsaturated esters of organic acids, especially vinyl acetate.

In recent years there has been an increased demand for unsaturated esters of organic acids in a variety of fields such as in the preparation of polymers, copolymers and resins from these polymers. In addition, these esters have been finding increased application in the synthesis of drugs and as chemical intermediate such as acetylating agents. These increased demands have led to attempts to produce these esters in high yields by economical and efficient processes. Although it is not intended to be limited thereto, for convenience the present process will be discussed and illustrated from time to time in terms of vinyl acetate.

The first mention of vinyl acetate was in 1912 when Klatte obtained it as a by-product in the preparation of ethylidene diacetate by the direct combination of acetic acid and acetylene in the presence of a mercury salt. Vinyl acetate is now produced commercially by the reaction of acetylene with acetic acid or by the reaction of acetaldehyde with acetic anhydride. A major disadvantage of these processes is the relatively high cost of the reactants. This shows up to an even greater degree in the preparation of esters other than vinyl acetate, for example, in the synthesis of propenyl acetate from methyl acetylene.

In a recently proposed process, United States Patent No. 3,190,912, an unsaturated organic compound, an organic acid and oxygen or an oxygen-containing gas are reacted in gas phase and in the presence of a Group VIII noble metal-containing, e.g., palladium metal, catalyst to form the corresponding unsaturated ester. The general reaction for preparing unsaturated esters by the process of this invention may be illustrated by the following equation:

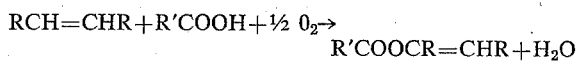

$$RCH=CHR+R'COOH+\tfrac{1}{2}O_2 \rightarrow R'COOCR=CHR+H_2O$$

wherein either or both R's may be hydrogen or a substituted or unsubstituted branched or straight chain, aliphatic, cycloaliphatic, or aromatic radical having from about 1 to 16 carbon atoms per molecule, the total number of carbon atoms per molecule not exceeding 18. R' may be hydrogen or a substituted or unsubstituted, branched or straight chain, aliphatic, cycloaliphatic or aromatic radical having from about 1 to 17 carbon atoms per molecule and preferably, because of the inherently low vapor pressures, between 1 and 10 carbon atoms per molecule.

An alkene having from about 2 to 18 carbon atoms per molecule may be employed as the starting material. Illustrative alkenes include ethylene, propylene, butene-1, butene-2, isobutylene, hexene-1, isooctene, triisobutylene, octadecene-1, pentene-2, pentene-3 and the like. Other unsaturated hydrocarbons which can be employed for this purpose include butadiene, styrene, p-chlorostyrene, allyl acetate, allyl benzene, ethyl acrylate, hexadine-1,5 and the like, as well as mixtures of one or more of the above. The use of ethylene as the unsaturated hydrocarbon feed material is especially preferred.

The free organic acid R'COOH containing from 1 to 18 carbon atoms that reacts with the unsaturated compound RCH=CHR may, for example, be formic, acetic, chloracetic, phenyl acetic, propionic, isobutyric, benzoic, p-toluic, lauric, palmitic, stearic and mixtures thereof. Dicarboxylic acids such as adipic acid may also be employed. Acetic acid is the preferred acid.

The above described vinylation reaction is generally carried out at a temperature between about 0° and 350° C., preferably about 50° to 250° C.; and under pressure conditions that may be about 15 to 1500 p.s.i., and preferably at a pressure within the range of about 15 to 250 p.s.i., in other words at superatmospheric pressures. It will be understood, however, that neither the temperature nor the pressure conditions employed are considered to be critical. Nevertheless, when carrying out the improved process of this invention, it was observed that the use of increased pressures, e.g., 60 p.s.i.g., had a positive effect on the rate of ester synthesis.

In the aforementioned vapor or gas phase process for the synthesis of unsaturated organic esters the stability of the catalyst is somewhat less than would be desirable for large scale commercial operations. The gradual decrease in activity of the catalyst is particularly disadvantageous in continuous or semi-continuous operations wherein the catalyst is used for relatively long periods of time for the production of esters.

It is an object of this invention to provide an improved vapor or gas phase process for producing unsaturated organic esters which avoids the catalyst difficulties encountered in presently known processes.

Another object of the invention is to provide a method for activating and regenerating catalysts employed in the vapor phase process for preparing unsaturated organic esters from unsaturated organic compounds and organic carboxylic acids. It is another object to provide a regeneration method for palladium catalysts employed in the preparation of unsaturated organic esters such as vinyl acetate.

A further object is to regenerate a spent palladium metal catalyst used for the preparation vinyl acetate by reacting ethylene, oxygen and acetic acid in vapor phase over said catalyst and further objects will become readily apparent from the following description of the invention.

Broadly described, the novel regeneration process comprises treatment of the spent catalyst at elevated temperatures with oxygen or an oxygen-containing gas such as air followed by contact of the catalyst with hydrogen to create a reducing atmosphere. As additional features and embodiments, it has been found advantageous to pretreat the spent or inactive catalyst with an inert gas such as nitrogen after which the catalyst is contacted with oxygen. For example, oxygen can gradually be added to the nitrogen stream, the nitrogen thus acting as a diluent for the oxygen, the relative amounts of which can be adjusted. Operating in this way, it is believed that the inert nitrogen assists by first removing most of the volatile organic residues which may be present, thereby substantially reducing the excessive heat which results from exothermic oxidation of these residues. Likewise, it is a further feature to use an inert gas purge between the oxygen and hydrogen treatment steps. Among the advantages of this purge is reduced hazard of forming explosive mixtures of hydrogen and oxygen.

The preferred catalysts used and which are the catalysts subjected to the herein described regeneration process are the Group VIII noble metal catalysts such as palladium, platinum, ruthenium, rhodium, iridium, etc. The use of a palladium catalyst is especially preferred. The catalysts may be employed either in the metal form itself or as a salt. The metal salt can be an aliphatic or aromatic carboxylic acid which has the general formula R'COOH wherein R' is either hydrogen, an alkyl or aryl group; the acid having a total of from 1 to 18 carbon atoms. Illustrative catalysts include palladium metal, platinum metal, ruthenium metal, rhodium metal, iridium metal, palladous acetate, palladous propionate, palladous benzoate, ruthenium acetate, platinous acetate, platinous benzoate, rhodium acetate and the like. For the purposes of the present invention, it is preferred not to use a Group VIII noble metal halide salt as the catalyst for producing the unsaturated organic esters. A zero valent palladium metal catalyst has been found to be especially useful as the synthesis catalyst.

The catalyst may be used as such or in conjunction with a carrier. It is also possible to deposit the catalyst on the walls of the reactor, on glass beads, etc., or to employ the catalyst in a fluidized bed or mixed with inert solids to prevent packing and plugging of the reactor. Outstanding results were achieved, however, with the catalyst deposited on a carrier. The preferred carriers are alumina or mixtures of barium, strontium or calcium carbonates with silica-alumina. The alumina carrier is especially preferred in view of the excellent results achieved when it is employed in conjunction with the aforedescribed catalysts.

In general, only catalytic amounts of the catalysts need be employed in the present process. The catalyst amount may range from about 0.1 to 5% by weight, based on the weight of the support, with a preferred range being about 0.5 to 2.0% by weight.

In accordance with another feature of this invention, the catalyst may be activated prior to its use in the synthesis reaction by adding thereto a minor amount of an alkali metal or alkaline earth metal organic acid salt or inorganic salt. The amount of the activator added may range from about 20 to 1000%, preferably from about 50 to 250%, by weight based on the weight of the noble metal content of the catalyst. The alkali metal or alkaline earth metal salts of weak acids, both organic and inorganic acids, have been found useful as activators for the Group VIII noble metal catalysts of this invention. Sodium, lithium and potassium salts have been found to be most effective, and the use of sodium salts, e.g., sodium acetate, is especially preferred. In general, the useful activator salts will be those whose aqueous solutions have a pH greater than about 7 or whose ionization constant is less than $10^{-1}$. The salts may have anions such as citrate, acetate, borate, phosphate, tartrate, benzoate, aluminate and the like. The use of alkali metal or alkaline earth metal hydroxides has also proven to be effective. Calcium salts of weak acids and calcium hydroxide of the alkaline earth metal base compounds have shown the most effective results for catalyst activation. As previously set forth, the presence of halide anions should be particularly avoided.

As one typical embodiment of carrying out the invention, the spent catalyst which has been in use in a vapor phase process for production of vinyl acetate from ethylene oxygen and acetic acid, is separated or removed from the process stream but not from the reactor itself. The reactor containing the catalyst bed is purged with an inert gas such as nitrogen at gas flow rates up to about 10,000 s.c.f.h./cf. of catalyst to remove initially volatile material from the catalyst bed. During this period gradually increasing temperatures up to about 250° to 500° C. are employed. Preferably, the inert gas purge is continued until no further condensable material is noted in the effluent gas stream. This may require 1 to 5 hours.

A small amount of air or oxygen (2–5%) is then added to the ingoing gas stream and flow is continued for 30 minutes to one hour. Meanwhile, the temperature and flow rate are continued as defined above. The oxygen content of the input stream is then increased gradually over a period of several hours and of such duration and rate of oxygen increase that the exothermic reaction can be controlled within desired temperature limits.

When the point is reached that the oxygen content of the stream is at least about 20 to 35%, the catalyst bed is maintained under a flow of the oxygen containing gas and at temperatures of 150° to 800° C., preferably 250° to 600° C., for a sufficient period of time to insure complete oxidation of the carbonaceous material deposited on the catalyst. The time required is usually from about 2 to 6 hours.

The bed is then cooled to about 50° to 250° C., meanwhile passing therein an inert gas such as nitrogen and then purging thoroughly with an inert gas. The catalyst bed is then treated with a flow of hydrogen or hydrogen containing gas until the catalyst is substantially reduced. This may require from about 0.5 hour to 2 hours at temperatures of 50° to 500° C. The reactor bed is finally purged with an inert gas before being employed again in the synthesis reaction.

The regeneration step of this invention is especially well adapted to use with spent catalysts or catalysts of reduced activity comprising palladium metal supported on inert carriers which do not react with oxygen at elevated temperature such as required for the regeneration step. Such inert carriers include alumina, silica, carbonates, and the like. As an example of such a catalyst capable of regeneration by the herein described process, there may be used a catalyst, containing up to about 5 per cent palladium metal and up to about 5 percent of an alkali acetate, on alumina.

It is apparent from the above that the exact procedure and conditions to be used may vary depending upon a number of factors in the process. Variables of the process include the times of the various treatment and purge cycles, temperatures, pressures, gas flow rates, and composition of the oxygen and hydrogen containing streams employed in the steps of the treatment. Generally, the higher the oxygen content in the oxygen-containing gas, the lower the temperature, or shorter the time required. Similarly, higher pressures of oxygen-containing gas, or hydrogen, will permit the use of lower temperatures or shorter times of exposure.

The factors affecting the foregoing include the type and kind of both the catalysts and the catalyst support, the extent to which the catalyst has been deactivated, the amount and type of residues deposited on the spent catalyst, as well as the type of equipment used as the reactor. It should be further understood that modifications from the foregoing catalyst regeneration procedure can be practiced without departing from the concept of the invention or losing the advantages which can be achieved by its use. For instance, a preliminary treatment with nitrogen or other inert gas can be omitted especially where organic residues are relatively low. Again in place of or in addition to the preliminary treatment with an inert gas, a pre-extraction of the catalyst with water and/ or organic solvents such as benzene, trichloroethylene, ethyl acetate, hexane, heptane, or the like can be used to remove inorganic and/or organic impurities. Further, the extraction or wash might be carried out at various stages of the regeneration procedure. For example the wash could be carried out between the oxidation and reduction steps or after reduction in addition to or in place of the pre-regeneration wash. Where such an extraction procedure is used it will normally be necessary to replace the alkali or alkaline earth activators as described.

It is also possible to use other inert gases instead of or admixed with the nitrogen diluent and purge streams. For example, steam may be used to replace a part or all of the nitrogen as the inert gas. In place of oxygen, air or ozone may be employed as the oxidizing gas. For the purpose of conducting the regeneration procedure the catalyst may be removed from the synthesis reactor. Or, as one preferred embodiment of this invention, the treatment steps which comprise the improved regeneration method, may be carried out with the catalyst in place as a continuous or semi-continuous method in sequential steps with minimum interruption to the synthesis process. In this operation the reactor is designed in such a manner that nitrogen in varying amounts can be introduced in substitution for the synthesis feed. In order to effect regeneration, oxygen can be admitted in required amounts and under the necessary conditions to carry out the first step. An intermediate stream of nitrogen can be admitted as required. The next step in the regeneration is then performed by introducing hydrogen, and final introduction of nitrogen completes the regeneration process. When this series of steps is carried out under the prerequisite conditions of gas flow, temperature and time, the "on stream" aspect of the reactor apparatus is interrupted for minimum periods, and the catalyst after such treatment has substantially the same catalytic activity as before. This mode of regeneration is particularly useful with a fluidized bed catalyst operation. The more detailed practice of the present invention is illustrated by the following examples. These examples are illustrative only and are not intended to limit the invention.

EXAMPLE I

A sample of fresh 1.25% palladium on ⅛" alumina pellets, treated with 1.64 g. of anhydrous sodium acetate per 100 g. of catalyst (deposited from aqueous solution) was placed in a ¾" O.D. glass tube and heated to 120–130° C. under a nitrogen stream. There was then passed a stream of 15% oxygen in ethylene, saturated in acetic acid at 60° C., over this catalyst bed at a rate of 2 liters per hour at atmospheric pressure and reaction temperature of 125° C. Reaction products, trapped at −76° C. were analyzed for vinyl acetate after 24 hours operation.

The above sodium acetate treated catalyst which had been used for the synthesis of vinyl acetate at elevated temperatures and superatmospheric pressures for an extended period was similarly tested for catalytic activity. It was found that catalytic activity had decreased considerably.

A regeneration process was carried out on 10 g. spent catalyst samples, under the following conditions, a number of runs being described.

Run 1

The spent catalyst was placed in a ¾" O.D. glass tube and heated to 400° C. under a stream of nitrogen of 2 liters per hour over a period of 1 hour. The nitrogen flow was slowly replaced with air over a 2-hour period while gradually increasing the temperature to 475° C. Once under a flow of all air at 2 liters per hour the temperature was increased to and held at 500° C. for one hour. The catalyst bed was flushed with nitrogen, cooled to 150° C., then hydrogen was passed at about 2 liters per hour at 150 to 200° C. for a period of 1½ hours. Finally the catalyst bed was flushed with nitrogen, cooled to room temperature, and tested for activity as previously described.

Run 2

The spent catalyst was treated as in Run 1 except that the maximum temperature used in the nitrogen and air treatments was 350° C.

Run 3

The spent catalyst was treated as in Run 1 except that the maximum temperature used in the nitrogen and air treatments was 225° C.

The results of these tests are tabulated below.

TABLE I

| Catalyst: | Production rate [1] |
|---|---|
| Fresh | 6.0 |
| Spent | 1.5 |
| Run 1 | 5.7 |
| Run 2 | 5.5 |
| Run 3 | 3.4 |

[1] In m. moles Vinyl Acetate/hr./10g. catalyst.

The above data shows that the novel regeneration method of this invention leads to outstanding results with respect to the catalytic production of unsaturated organic esters. It is also demonstrated that the excellent results achieved when the regeneration method is employed are comparable with the results obtained using freshly prepared catalyst as described above.

EXAMPLE II

In attempting to regenerate and reactivate the catalyst in other ways, certain methods were attempted which proved relatively ineffective. These results are not equivalent to those obtained by the invention process.

TABLE II

| Run No. | Gas | Hours | Temp., ° C. | Flow, Liter/Hr. | Vinyl Acetate Yield, Mmole/Hr. |
|---|---|---|---|---|---|
| 4 | $N_2$ Only | 1 | 400 | 2 | 0.1 |
| 5 | $N_2$ | 1 | 400 | 2 |  |
|  | $N_2$ plus Air | 2 | 400–475 | 2 |  |
|  | Air | 1 | 475–515 | 2 | 0.1 |
| 6 | $N_2$ Only | 1 | 400 | 2 |  |
|  | $H_2$ | 1½ | 150–165 | 2 | 0.1 |

As can be seen from the above data, when using steps falling outside of the herein described method, the attempted regeneration method is ineffective as compared to the present process.

EXAMPLE III

A palladium metal on alumina catalyst which had been used in a vapor phase vinyl acetate process was divided into a number of 10 g. portions as indicated below. With the exception of an untreated control (Sample A) and a portion of the catalyst treated with air starting at room temperature (Sample J), all samples were heated under nitrogen flow to 450° C. over a period of 1 hour prior to treatment listed below in Table III. All of the samples with the exception of control (Sample A) were given a final treatment with hydrogen at 150° to 170° C. for one hour. In all instances, the gas flows were approximately 2 liters per hour. Activities for production of vinyl acetate, were determined as set forth in Example 1 above.

TABLE III

| Sample | Percent $O_2$ | Time, Hours | Temp., ° C. | Pressure, P.s.i.g. | Vinyl Acetate Yield, Mmoles/Hr. |
|---|---|---|---|---|---|
| A (control) |  |  |  |  | 0.6 |
| B | [1] 21 | 2 | 500 | 0 | 3.8 |
| C | [1] 21 | 18 | 500 | 0 | 4.0 |
| D | [2] 50 | 2 | 550 | 0 | 4.0 |
| E | [2] 100 | 2 | 250 | 0 | 3.0 |
| F | [2] 100 | 2 | 350 | 0 | 3.7 |
| G | [1] 21 | 2 | 250 | 0 | 2.7 |
| H | [1] 21 | 2 | 250 | 500 | 4.0 |
| I | [1] 21 | 2 | 295 | 500 | 4.1 |
| J | [1] 21 | 2 | 500 | 0 | 4.2 |

[1] Air.
[2] This oxygen treatment was in addition to 2 hours under air at the same temperature.

The above data show that an increase in the partial pressure of oxygen over that present in air or by using air at superatmospheric pressures permits a reduction in the temperature required for the oxidation step of this process.

The use of the regeneration procedure with catalyst activators will be more fully understood by reference to the following embodiment:

EXAMPLE IV (A) A 10 gram batch of fresh 1.6 percent palladium metal on 1/8 inch alumina pellets and containing 100% by weight sodium acetate based on palladium was employed in the vinyl acetate synthesis process described in Example 1, Paragraph A. Vinyl acetate was produced at a rate of 8.5 m. moles per hour. After an extended period of use, the vinyl acetate production dropped to a rate of 1.6 m. moles per hour.

(B) The spent palladium catalyst of Run A was treated in the same manner as described in Example 1, Run No. 1, to effect regeneration. When employed in the synthesis reaction the regenerated catalyst yielded vinyl acetate at a rate of 4.5 m. moles per hour.

(C) In another series of runs, the spent palladium catalyst of Run A was placed in a Soxhlet extraction apparatus and subjected to water extraction for 15 hours. 10 grams of the extracted catalyst was treated with 0.16 gram of anhydrous sodium acetate, whereas a second 10 gram batch of the extracted catalyst was regenerated in the same manner as described in Example 1, Run No. 1, and then treated with 0.16 gram of anhydrous sodium acetate. The aforedescribed catalysts produced 1.6 and 8.0 m. moles of vinyl acetate per hour, respectively, when employed again in the synthesis reaction.

While particular embodiments of this invention are shown above, it will be understood that the invention is obviously subject to variations and modifications without departing from its broader aspects.

What is claimed is:

1. The method of reactivating a spent palladium catalyst for reuse in the vapor phase preparation of unsaturated organic esters, by reacting alkenes having 2 to 18 carbon atoms per molecule with organic carboxylic acids having 1 to 18 carbon atoms per molecule in the presence of oxygen which comprises the steps of contacting, in the absence of a halogen compound, a spent palladium catalyst deposited on an inert carrier successively (1) with an inert gas at elevated temperatures for a sufficient amount of time to remove volatile material, (2) with oxygen or air for 2 to 6 hours at 150° to 800° C., (3) with an inert gas to purge the catalyst, (4) with hydrogen for ½ to 2 hours at 50° to 500° C., and (5) with an inert gas to purge the catalyst.

2. The method of claim 1 wherein said inert gas is nitrogen.

3. The method of reactivating a spent palladium catalyst for reuse in the vapor phase preparation of vinyl acetate, by reacting ethylene with acetic acid in the presence of oxygen which comprises the steps of contacting, in the absence of a halogen compound, a spent palladium catalyst deposited on an inert carrier successively (1) with an inert gas at elevated temperatures for a sufficient amount of time to remove volatile material, (2) with oxygen or air for 2 to 6 hours at 150° C. to 800° C., (3) with an inert gas to purge the catalyst, (4) with hydrogen for ½ to 2 hours at 50° to 500° C., and (5) with an inert gas to purge the catalyst.

4. The method of claim 3 wherein said inert gas is nitrogen.

5. The method of claim 3 wherein the palladium catalyst is supported on alumina and contains a minor amount of an activator selected from the group consisting of alkali metal and alkaline earth metal salts.

6. The method of claim 5 wherein said activator is sodium acetate.

References Cited

UNITED STATES PATENTS

| | | | |
|---|---|---|---|
| 2,916,440 | 12/1959 | Hogin | 208—140 |
| 2,304,653 | 12/1942 | Pyzel | 252—237 |
| 3,142,713 | 7/1964 | Carr | 260—683.65 |
| 3,221,045 | 11/1965 | McKeon | 260—497 |

PATRICK P. GARVIN, Primary Examiner